REFRACTORY CLOSURE MEMBER FOR BOTTOM POUR VESSELS

Original Filed May 6, 1965 4 Sheets-Sheet 1

INVENTOR
JAMES T. SHAPLAND

REFRACTORY CLOSURE MEMBER FOR BOTTOM POUR VESSELS

Original Filed May 6, 1965 4 Sheets-Sheet 2

INVENTOR
JAMES T. SHAPLAND

REFRACTORY CLOSURE MEMBER FOR BOTTOM POUR VESSELS

Original Filed May 6, 1965 4 Sheets-Sheet 3

INVENTOR
JAMES T. SHAPLAND

INVENTOR
JAMES T. SHAPLAND

United States Patent Office

Re. 27,237
Reissued Nov. 23, 1971

27,237

REFRACTORY CLOSURE MEMBER FOR BOTTOM POUR VESSELS

James T. Shapland, Wilkins Township, Allegheny County, Pa., assignor to United States Steel Corporation Original No. 3,352,465, dated Nov. 14, 1967, Ser. No. 453,730, May 6, 1965. Application for reissue Nov. 14, 1969, Ser. No. 871,505
Int. Cl. B22d *37/00*
U.S. Cl. 222—512 18 Claims

Matter enclosed in heavy brackets [ ] appears in the original patent but forms no part of this reissue specification; matter printed in italics indicates the additions made by reissue.

ABSTRACT OF THE DISCLOSURE

A closure for the discharge outlet of a bottom-pour vessel for holding molten metal, in the form of a refractory block, is slidably mounted on guide rails carried below the vessel by spring-urged pivoted levers. Flanges at the sides of the block ride on the rails. A hole through the block is brought in register with the outlet by a fluid-pressure cylinder.

This invention relates to bottom pour vessels adapted for use in the continuous casting of steel, and more particularly to means for controlling the rate of discharge of the molten steel from such vessels.

Stopper rods such as those commonly used on bottom pour ladles are not suitable for either tundishes or vacuum degassing vessels for several reasons. First of all, it is desirable in continuous casting to introduce molten steel into the mold over long periods of time, and indefinitely if possible. Stopper rods and bottom pour nozzles have a short life, frequently one hour or less, in the presence of molten steel. This necessitates taking the vessel offstream whenever it is necessary to replace either the nozzle or the stopper rod. Furthermore, a stopper rod is not suited for use in a degassing vessel, because the stopper rod and associated mechanism for its operation are located partly inside and partly outside the vessel, requiring a vacuum tight seal.

Summary of the invention

The apparatus of this invention includes a bottom pour vessel having a discharge nozzle in the bottom wall thereof and means for controlling the discharge of molten steel through said nozzle comprising a slidable refractory closure member, means for sliding the closure member into and out of nozzle closing position, and means for holding the closure member against the exterior end of the nozzle. According to one embodiment of this invention, the closure member is a slidable refractory block having an imperforate portion and a teeming opening for closing and opening the nozzle, respectively. According to another embodiment, the closure member comprises a plurality of separate refractory plates including an imperforate plate for closing the discharge nozzle and a plate having a teeming opening for controlled discharge of steel.

Description of preferred embodiment

Figure 1:
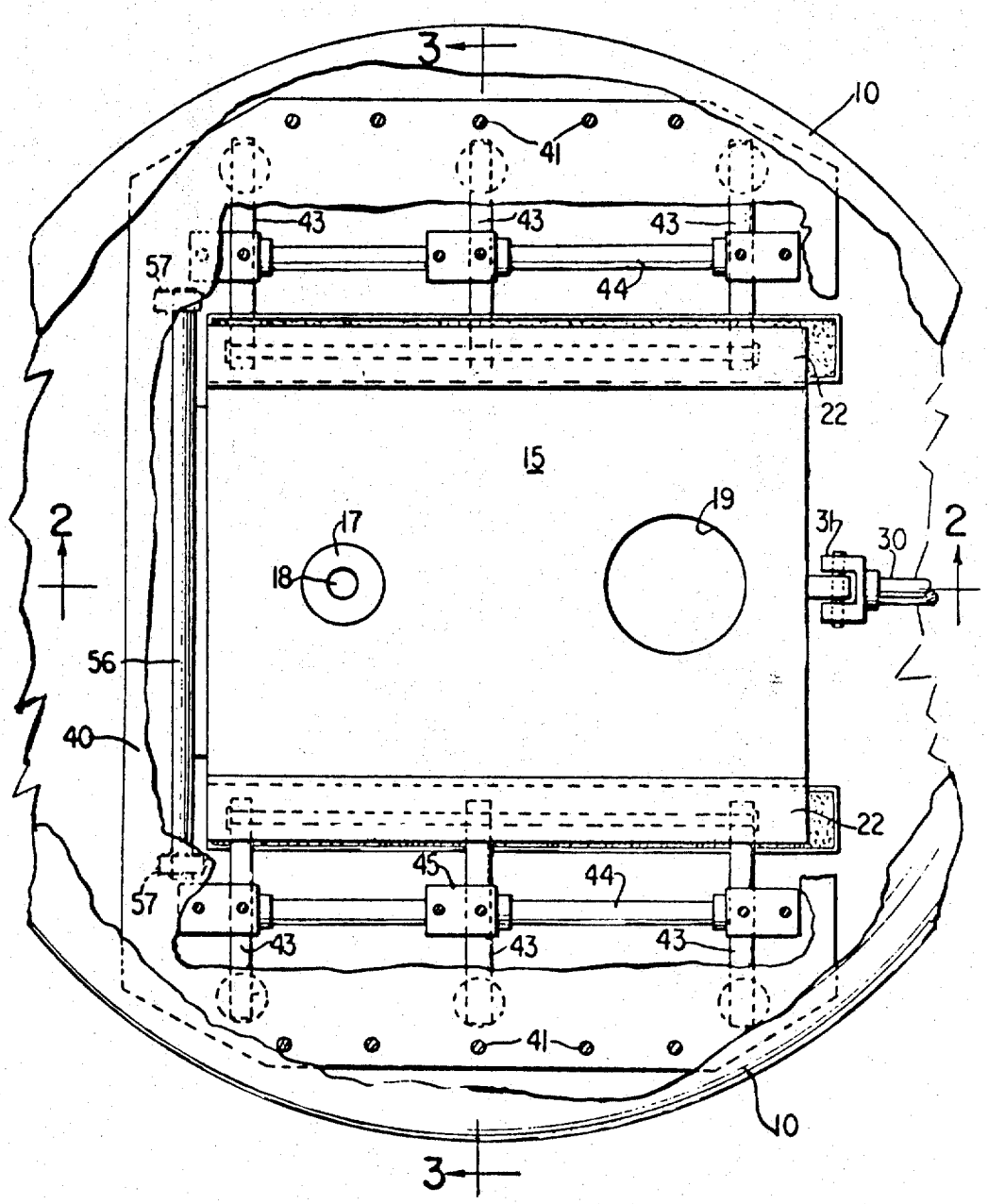
FIG. 1 is a top plan view, with parts broken away, of a vessel and closure device according to one embodiment of this invention.

Referring now to FIGS. 1 to 3, 10 is a refractory lined bottom pour vessel, such as a degassing vessel or tundish, which is adapted to contain molten steel. Vessel 10 has a bottom wall 11 which has a nozzle 12 for the discharge of molten steel from the vessel. Nozzle 12 is a sleeve shaped member, defining a cylindrical bore 13 and having a flat exterior end 14 which is adapted to receive a refractory closure member in sliding contact. Because of the extreme amount of wear to which nozzle 12 is subjected, it is desirable to make this nozzle of a refractory which is more resistant to erosion than the refractory which lines the interior of vessel 10.

Figure 2:
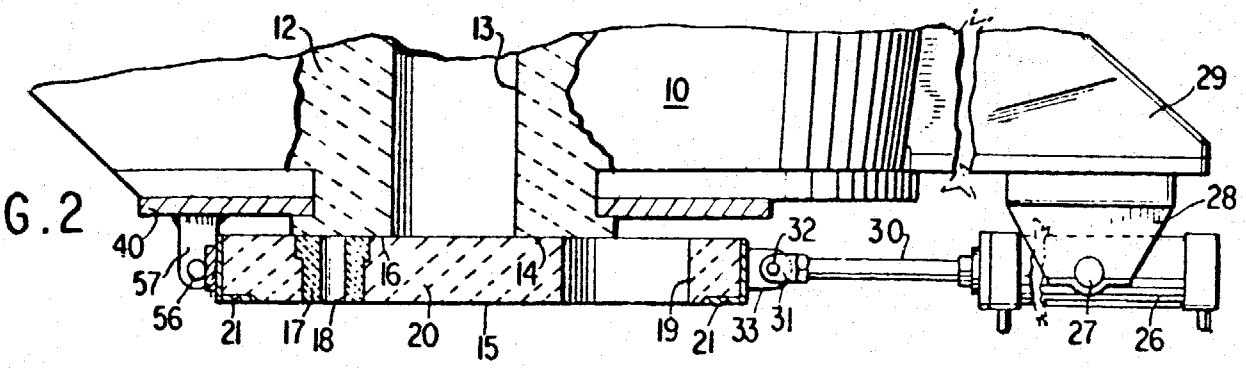
FIG. 2 is a vertical sectional view taken along line 2—2 of FIG. 1.
Figure 3:
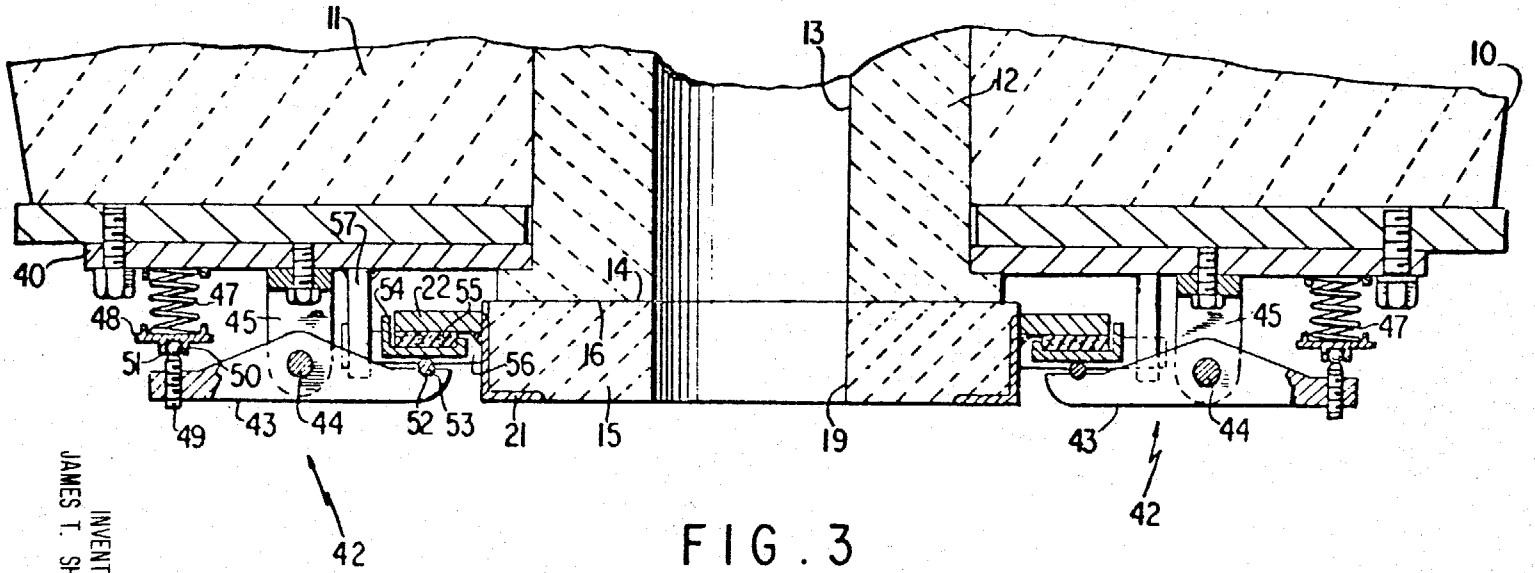
FIG. 3 is a vertical sectional view taken along line 3—3 of FIG. 1.
Figure 4:
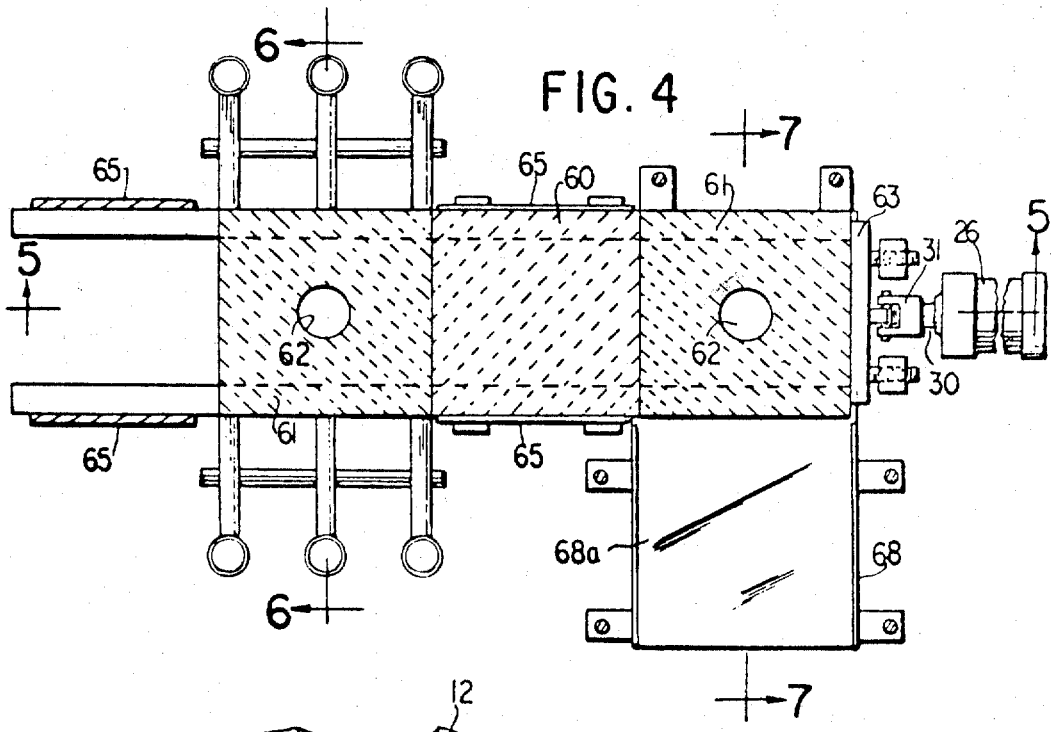
FIG. 4 is a top plan view, with parts shown in section, of a modified closure device according to this invention.
Figure 5:
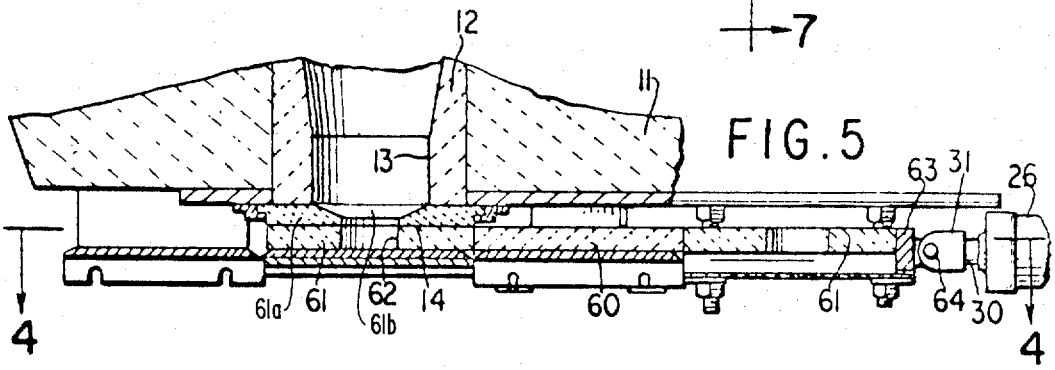
FIG. 5 is a sectional view, taken along line 5—5 of FIG. 4.
Figure 6:
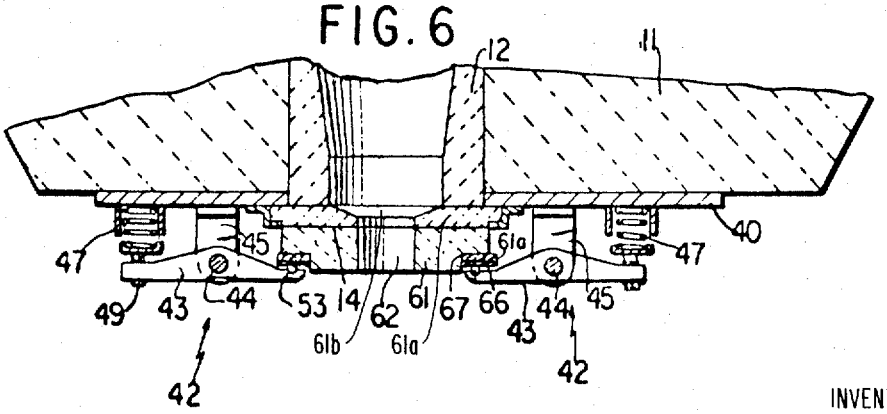
FIG. 6 is a sectional view taken along line 6—6 of FIG. 4.

Vessel 10 in the embodiment of FIGS. 1–3 includes means for controlling the discharge of molten steel through nozzle 12 comprising a slidable refractory closure member 15 mounted on the exterior of vessel 10. Closure member 15 is movable between nozzle-opening position, in which steel is discharged at a controlled rate from vessel 10, and nozzle-closing position in which the discharge of molten steel from vessel 10 is prevented. Closure member 15 is in the shape of a rectangular block or panel 15 having a flat upper surface 16 which is adapted to make sliding contact with the exterior end surface 14 of nozzle 12. Refractory block 15 includes a tubular nozzle insert 17 defining a restricted opening 18 for teeming of molten steel, a second opening 19 which is of the same diameter as the bore of nozzle 13 for preheating the vessel, and an imperforate central portion 20 located between teeming opening 18 and large opening 19 for closing of nozzle 12 so as to prevent discharge of molten steel from vessel 10. Nozzle insert 17 is preferably made of a refractory which is more resistant to erosion than the refractory material of which the remainder of closure member 15 is made. Opening 19 of large diameter is used only when vessel 10 is empty, and serves primarily to permit preheating of vessel 10. L-shaped angles 21 are provided along the outer edges of closure member 15 around the entire perimeter thereof in order to provide support for and prevent chipping of the edges. A plurality of metal flanges 22, welded to angles 21 and extending outwardly therefrom provide contact surfaces for engagement by supporting members which hold closure member 15 in contact with the exterior end 14 of nozzle 12, as will be hereinafter described.

Sliding movement of closure member 15 is effected by means of a fluid pressure cylinder 26, which is supported by trunnions 27 on U-shaped bracket 28, which in turn is affixed to mounting bracket or flange 29 secured to the side of vessel 10. Cylinder 26 has a piston rod 30 extending therefrom in one direction. This piston rod 30 terminates in a yoke 31 which is secured by pin 32 to tongue 33, which in turn is welded to angle member 21. The admission of fluid under pressure to one side or the other of cylinder 26 effects reciprocating movement of refractory closure member 15 between nozzle-opening position, in which teeming opening 18 is aligned with nozzle bore 13, and nozzle-closing position, in which the imperforate central portion 20 of closure member 15 prevents ow of steel through nozzle bore 13. Opening 19 in osure member 15 is not placed in alignment with the ischarge opening 13 of vessel 10 except when the ves- l is empty, as previously indicated. Appropriate limit op means to be hereinafter described prevent the ac- idental movement of refractory block 15 to the position which opening 10 is aligned with discharge opening 13.

A metal plate 40 of generally rectangular cross section affixed to the exterior side of the bottom wall of ves- l 10 by means of screws 41. This plate 40 carries the ructure 42 which holds refractory block 15 against the xterior end 14 of nozzle 12. This support structure 42 cludes a plurality of spring loaded levers 43 on either de of nozzle 12. Levers 43 are pivotally mounted near eir centers on a pair of longitudinally extending rods 44, ne on either side of nozzle 12. Rods 44 are supported om plate 40 by means of tongues 45. The outer ends of vers 43 are urged downwardly by compression springs 7. This causes the inner ends of levers 43 to press up- ardly against lugs 22, thereby holding refractory closure ember 15 in fluid-tight engagement against the lower nd 14 of nozzle 12.

Compression springs 47 are located between plate 40 nd retainer plates 48, urging the latter downwardly. he compressive force of springs 47 is transmitted to vers 43 through set screws 49, which are received in crew-threaded sockets in levers 43 and which terminate t their upper ends in ball joints 50 mounted in swivel ockets 51 on retainer plates 48, providing operative con- ections between springs 47 and levers 43. The compres- ve force exerted by springs 47 can be regulated by ad- istment of the positions of set screws 49. Levers 43 have cesses 52 at their inner ends for receiving metal rods 53 hich preferably extend longitudinally. One of these rods 3 is located on either side of nozzle 12. Metal rods 53 re welded to bars or rails 54 positioned below lug 22 and aving upstanding flanges along both sides. A pad 55 of raphite or other suitable lubricating material is prefer- bly interposed between bar 54 and flange 22.

Movement of sliding refractory closure member 15 to position placing opening 19 in alignment with nozzle pening 13 is prevented by means of a limit stop which constituted by a laterally extending rod 56 supported t each end by lugs 57 depending from plate 40. In order slide closure member 15 to the position in which open- ig 19 is aligned with nozzle bore 13, rod 56 is first re- oved. Admission of fluid to cylinder 26, instead of mov- ig refractory closure member 15 to nozzle-closure posi- on, will then cause the closure member 15 to continue move until larger diameter opening 19 is aligned with ozzle bore 13.

In the operation of the device illustrated in FIGS. 1 to , closure member 15 is moved to nozzle-closing position y appropriate actuation of cylinder 26 before any molten eel is poured into vessel 10. Molten steel is then poured nto vessel 10. The nozzle opening 13 is then placed over e receptacle which is to receive molten steel, as for xample a continuous casting mold. Closure member 15 then moved to nozzle-opening position, in which open- ig 18 is aligned with nozzle opening 13, by appropriate ctuation of cylinder 26. When it is desired to cut off flow f molten steel from vessel 12, refractory closure mem- er 15 is again moved to nozzle-closing position as shown FIG. 2. Limit stop 56 prevents accidental alignment of rge diameter opening 19 with nozzle opening 13.

The closure member 15 provides a fluid-tight closure r vessel 10, and is therefore particularly well suited for se on vacuum degassing vessels. This closure member is ee from operating difficulties due to freezing steel, since e sliding movement of the closure member prevents cumulation of molten steel between the closure mem- er and the exterior end 14 of nozzle 12. The exterior cation of closure member 15 permits rapid replace- ent, minimizing the length of time the vessel 10 is out f service for such replacement.

Description of modification

The modification illustrated in FIGS. 4 to 7 permits replacement of worn flow-control and closure members without shutdown of the vessel. This modification also makes it possible to teem molten steel at different rates. The means for controlling the discharge of molten steel comprises a plurality of separate refractory plates, including an imperforate closure plate 60 and a flow-control plate 61 having a teeming opening 62 therein. Both plates 60 and 61 are flat square or rectangular plates having guide ways 61a along their lower outside edges. Means are provided for sliding these refractory plates successively into and out of position beneath nozzle 12 so as alternately to open and close discharge opening 13. A plurality of flow-control plates 61 having teeming openings 62 of different diameters permits control of the discharge rate of molten steel from vessel 10. The structure of bottom-pour vessel 10, which has a refractory-lined outer wall structure including a bottom wall 11 having a nozzle 12 therein, may be identical to that described in connection with FIGS. 1 to 3. *The nozzle has a flat refractory body 61a positioned above sliding plates 60 and 61. The flat refractory body 61a has a tapered opening 61b with a large dimension next to the nozzle bore, and an opposite smaller dimension which corresponds to the teeming opening 62 in plate 61.*

Refractory plates 60 and 61 are moved in a linear path into and out of position beneath nozzle opening 13 by means of a fluid pressure cylinder 26 and pusher 63.

Cylinder 26 has a piston rod 30 which terminates in tongue 31. Pusher 63 extends the entire width of plates 60 and 61 and is secured to tongue 31 by pin 64. This pusher 63 is adapted to contact the edge of refractory plate 60 or 61 and to push a series of such plates in edge-to-edge engagement in a linear path away from cylinder 26. A pair of guides 65 extending parallel to the axis of cylinder 26 are provided for guiding the movements of refractory plates 60 and 61 into and out of engagement with the exterior end 14 of nozzle 12. These guides include graphite bars 67 and metal supporting bars or rails 66, both of rectangular cross section. Supporting bars 66 are welded to rods 53 to prevent lateral movement.

At least one imperforate plate 60 and one plate 61 having a teeming opening are placed on guides 65. Pusher 63 contacts an edge of one of these plates, pushing both plates in edge-to-edge engagement along guides 65 away from cylinder 26. Nozzle opening 13 is alternately opened and closed by placing first a flow control plate 61 and then an imperforate plate 62 in contact with the exterior end 14 of nozzle 12. For convenience a plurality of imperforate plates 60 and flow-control plates 61 may be placed in alternating sequence on guides 65. Two successive flow-control plates 61 may also be placed on guides 65, as for example when an eroded flow-control plate 61 is being replaced. A table of 68a having a pair of laterally extending guides 68 provides a convenient means for placing refractory plates 60 and 61 on longitudinally extending guides 65 in a position where they may be contacted by pusher 63.

The structure 42 for maintaining refractory plates 60 and 61 in contact with the exterior end 14 of nozzle 12 is the same as the corresponding structure 42 illustrated to FIGS. 1 to 3.

The device of FIGS. 4 to 7 permits changing of flow-control plates 61 without interruption of use of vessel 10. When a plate 61 becomes eroded and is no longer useful, or in the event opening 62 becomes partly obstructed by skull or non-metallic inclusions, the defective plate 61 is moved out of the way and a new plate 61 substituted in its place by sliding the plates along guides 65.

In operation according to FIGS. 4 to 7, a vessel 10 is positioned so that nozzle 12 is directly above a receptacle, such as a continuous-casting mold, which is to receive steel from the vessel. During start-up of the apparatus, an imperforate closure plate 60 is placed over nozzle opening 13 to prevent discharge of steel until vessel 10 is filled to the desired operating level. A uniform operating level in vessel 10 is desirable in order to maintain a constant discharge rate. Imperforate refractory plate 60 is pushed out of position beneath nozzle 12 and flow-control plate 61 having a teeming opening 62 is pushed into position by pusher 60 to initiate pouring. To stop pouring, plate 61 is pushed out of position and an imperforate plate 60 is pushed into position by pusher 63.

The structure of FIGS. 4 to 7 readily permits controlling of teeming rates, simply by use of a plurality of plates 61 having openings 62 of different diameters.

Figure 8:
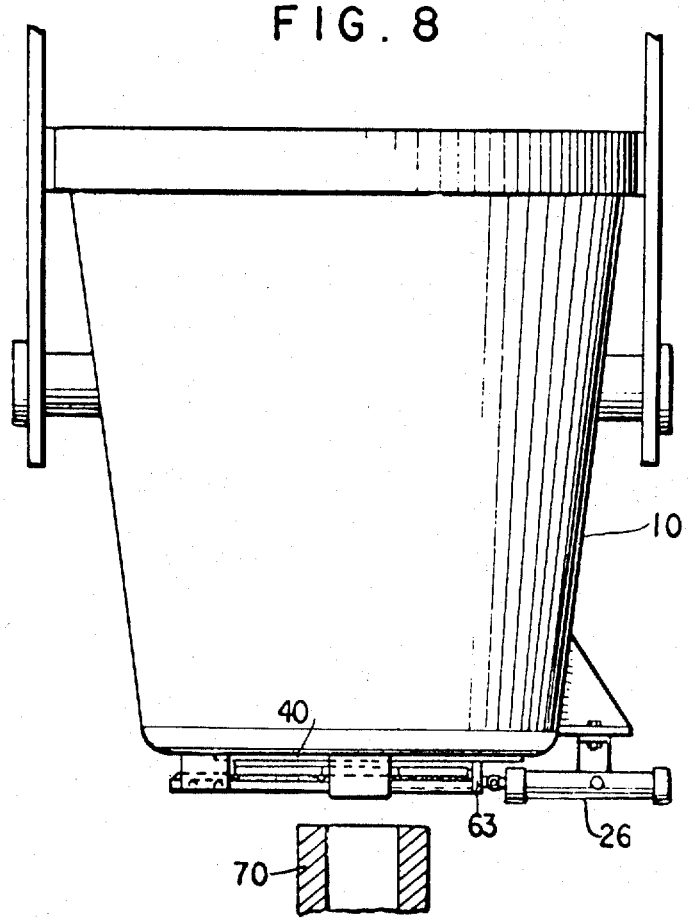
FIG. 8 is an elevational view of a vessel having the closure device of this invention mounted on the exterior thereof shown in a position above a continuous casting mold.
Figure 7:
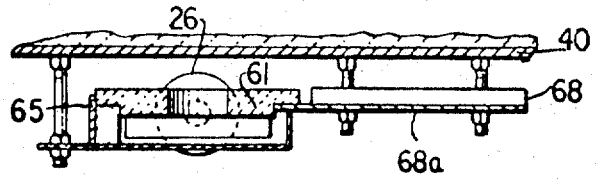
FIG. 7 is a sectional view of a detail taken along line 7—7 of FIG. 4.

Referring now to FIG. 8, a bottom pour vessel 10 having a closure device as illustrated in FIGS. 4 to 7 is positioned so that the discharge nozzle 12 is directly above a vertical tubular open-ended water-cooled continuous-casting mold 70. The nozzle 12 is closed by means of an imperforate refractory plate until it is desired to pour molten steel into mold 70. Then cylinder 26 is actuated so as to push refractory plate 60 out of the way and push a flow-control refractory plate 61 having a teeming opening therein into position beneath nozzle 70. This permits teeming of molten steel into the mold 70 at a controlled rate. The teeming rate depends on the diameter of the teeming opening 62 in refractory plate 61. When the teeming opening in refractory plate 61 becomes enlarged due to erosion, a second refractory plate 61 is substituted therefor simply by pushing the old plate 61 out of the way and pushing the new plate 61 into its place. To cut off the flow of molten steel, an imperforate plate 60 is pushed into position beneath nozzle 12 in place of the refractory plate 61 having a teeming opening.

Vessel 10 has been illustrated as a vacuum degassing vessel in FIG. 8. Of course, vessel 10 may be any type of vessel suitable for containing molten steel, as for example a tundish. Although the present invention has been described with particular reference to apparatus for handling molten steel, it will be understood that the invention is applicable to high-temperature apparatus for handling other molten metals.

While FIG. 8 illustrates a closure device for the embodiment shown in FIGS. 4 to 7, it will be understood that the closure device shown in FIGS. 1 to 3 may be provided on the exterior of vessel 10 instead.

What is claimed is:

1. In a bottom-pour vessel for teeming steel, having a nozzle in the bottom thereof and a panel slidable on said bottom to control flow through said nozzle, the improvement comprising a row of levers of the first class pivotedly attached to the bottom of said vessel on each side of said panel normal to the path thereof, a rail on each side of said panel parallel to said path engaged and supported by the inner ends of the adjacent levers, a bearing surface on each side of said panel engaged and supported by the adjacent rail, and means urging the outer end of each lever downward.

2. An apparatus as defined in claim 1, characterized by said means being compression springs.

3. An apparatus as defined in claim 2, characterized by ball bearings between said springs and levers.

4. An apparatus as defined in claim 1, characterized by pivot bearing means between said rails and levers permitting tilting of the rails on axes parallel to the path of said panel.

5. An apparatus as defined in claim 1, characterized by said bearing surface being a flange projecting laterally from the panel.

*6. A method for replacing a flat surface flow control refractory plate in fluid-tight engagement with a flat discharge nozzle in a bottom pour molten metal vessel without requiring shutdown of the vessel, including the steps of*

*placing a plurality of flat surface refractory plates in linear alignment along guideways positioned below said discharge nozzle,*

*pushing the last plate in said linear alignment so that as the plates move in edge to edge contact the first flow control plate is pushed in a linear path out of position below said discharge nozzle and another flow control plate is pushed into position below said discharge nozzle, and*

*urging each positioned refractory plate into fluid-tight engagement with said flat discharge nozzle.*

*7. A method which includes the steps of claim 6, and which further includes a plurality of flow control plates having teeming openings the teeming openings in the flow control plates having differing diameters so that different teeming rates may be attained by moving a flow control plate with a different diameter into position below said discharge nozzle.*

*8. A method which includes the steps of claim 6, and which further includes positioning an additional refractory plate by advancing said refractory plate along a path which is normal to said linear path until said additional refractory plate is advanced into position along said linear path.*

*9. A method which includes the features of claim 6, wherein at least successive flow control plates, each having a teeming opening, are placed in said linear path so that one plate may be replaced by a succeeding plate following erosion of said one plate.*

*10. A method which includes the steps of claim 6, wherein a flow control plate with a teeming opening and an imperforate plate to stop pouring of the discharge nozzle are placed in adjacent linear alignment.*

*11. A method which includes the steps of claim 6, and further includes placing a flow control plate and an imperforate plate in alternating sequence on said guideways to comprise said plurality of plates.*

*12. A refractory flow control member for slidably contacting a discharge nozzle of a bottom pour molten metal vessel, said closure adapted to be held in face to face contact with said nozzle by opposed yieldable supporting members mounted to the exterior of said vessel, said supporting members defining a flow control space therebetween, including,*

*a refractory plate having upper and lower refractory contact surfaces dimensioned to be received in said flow control space,*

*said upper surface being formed for pressure face to face fluid-tight contact with said discharge nozzle,*

*a continuous protective metal support fixed to opposed lateral edges of said plate,*

*said metal support having edges not above said upper surface to avoid interference with the pressure face to face sealing contact of the plate with the discharge nozzle,*

*flange means on the metal support at each of two opposed lateral edges and intermediate the upper and lower surfaces of said plate to provide flange contact surfaces for sliding yieldable engagement with said supporting members,*

*said flange means being proportioned and oriented beneath the upper surface to thereby avoid interference with the pressure face to face fluid-tight engagement between the upper surface of the plate and discharge nozzle, and further permitting sufficient refractory to remain interposed between the refractory contact surfaces and molten metal to shield said contact surfaces from radiation and spatter.*

*13. A refractory flow control member as defined in claim 12 wherein said refractory plate is imperforate thereby providing a closure member for the bottom pour vessel.*

*14. A refractory flow control member as defined in 'aim 12 wherein said plate has a teeming opening for 'ignment with said discharge nozzle.*

*15. A refractory flow control member as defined in 'aim 14, and further including an opening in said refrac- ›ry plate larger than said teeming opening, said larger pening being aligned with said discharge nozzle to allow reheating of an empty vessel.*

*16. A refractory flow control member as defined in 'aim 14, wherein said protective continuous metal sup- ort is an L-shaped angle, and said flange means are a lurality of flanges secured to said L-shaped angle.*

*17. A refractory control member as defined in claim 4 wherein said refractory plate further includes a refrac- ›ry insert around said teeming opening, said refractory ısert having greater erosion resistance than the remain- ıg body refractory.*

*18. A refractory flow control member as defined in 'aim 14, which further includes a flat refractory body, ıid flat refractory body having a tapered bore with a ırge dimension at one surface substantially correspond- ıg to the dimension of the bore in the discharge nozzle, nd a smaller dimension at the opposite surface corre- ›onding to the dimension in the teeming opening in the efractory plate.*

References Cited

The following references, cited by the Examiner, are of record in the patented file of this patent or the original patent.

UNITED STATES PATENTS

| | | | |
|---|---|---|---|
| 311,902 | 2/1885 | Lewis | 222—251 |
| 506,328 | 10/1893 | Morris. | |
| 3,192,582 | 7/1965 | Cope et al. | |
| 977,271 | 11/1910 | Callaghan | 222—512 |
| 1,160,775 | 11/1915 | Shearer | 267—17 |
| 2,921,351 | 1/1960 | Momm | 251—11 |
| 3,259,946 | 7/1966 | Blue | 164—344 |
| 3,454,201 | 7/1969 | Fichera | 222—561 X |
| 3,480,186 | 11/1969 | Grosko | 222—512 |

FOREIGN PATENTS

| | | | |
|---|---|---|---|
| 1,155,082 | 4/1958 | France. | |
| 25,182 | 8/1898 | Great Britain. | |
| 611,024 | 10/1960 | Italy. | |
| 672,687 | 11/1965 | Belgium | 222—561 |

ROBERT B. REEVES, Primary Examiner

D. A. SCHERBEL, Assistant Examiner

U.S. Cl. X.R.

222—561